(12) United States Patent　　(10) Patent No.: US 8,286,497 B2
Clothier et al.　　(45) Date of Patent: Oct. 16, 2012

(54) STRAIN SENSOR

(75) Inventors: Brian L. Clothier, Wichita, KS (US); Evgeni Sorkine, Moscow (RU)

(73) Assignee: TSI Technologies LLC, Wichita, KS (US)

( * ) Notice: Subject to any disclaimer, the term of this patent is extended or adjusted under 35 U.S.C. 154(b) by 225 days.

(21) Appl. No.: 12/796,322

(22) Filed: Jun. 8, 2010

(65) Prior Publication Data

US 2011/0023620 A1　　Feb. 3, 2011

Related U.S. Application Data

(60) Provisional application No. 61/269,448, filed on Jun. 25, 2009, provisional application No. 61/273,031, filed on Jul. 30, 2009.

(51) Int. Cl.
*G01B 7/16*　　(2006.01)

(52) U.S. Cl. .......................................... 73/779; 73/777

(58) Field of Classification Search ................... 73/760, 73/777, 779
See application file for complete search history.

(56) References Cited

U.S. PATENT DOCUMENTS

| | | | | |
|---|---|---|---|---|
| 5,159,347 | A * | 10/1992 | Osterwalder | 343/787 |
| 5,869,835 | A | 2/1999 | Udd | |
| 6,556,139 | B2 * | 4/2003 | Manov et al. | 340/572.6 |
| 6,747,559 | B2 * | 6/2004 | Antonenco et al. | 340/572.1 |
| 6,910,384 | B2 * | 6/2005 | Tomka et al. | 73/779 |
| 6,993,392 | B2 * | 1/2006 | Nicolelis et al. | 607/45 |
| 7,188,768 | B1 * | 3/2007 | Rozumek et al. | 235/440 |
| 7,852,215 | B2 * | 12/2010 | Marin Palacios et al. | 340/572.1 |

FOREIGN PATENT DOCUMENTS

| | | |
|---|---|---|
| JP | 09273906 | 10/1997 |
| JP | 2000-258112 | 9/2000 |
| JP | 2005337845 | 8/2005 |
| WO | WO2010028319 A2 | 3/2010 |

OTHER PUBLICATIONS

International Search Report and Written Opinion; Dated Jan. 26, 2011; S/N PCT/US2010/038601; Filed Jun. 15, 2010.

* cited by examiner

*Primary Examiner* — Max Noori

(74) *Attorney, Agent, or Firm* — Hovey Williams LLP

(57) ABSTRACT

Improved microwire strain sensor elements (20, 40, 52, 62) and corresponding methods are provided, which permit accurate, wireless strain monitoring of a variety of structures, including composite structures, through use of a remote detector (28). The sensor elements (20, 40, 52, 62) have amorphous or nanocrystalline metallic alloy microwire cores (22, 48), which exhibit substantially reduced remagnetization responses when the sensor elements (20, 40, 52, 62) are coupled with a structure to be strain-monitored, and the structures are in an unstrained condition. When the monitored structure experiences a strain above a pre-selected threshold value, the microwire cores (22, 48) exhibit substantially different remagnetization responses as an indication that the monitored structure has experienced a strain above a strain threshold or over a range of strain. In use, the strain sensor elements (20, 40, 52, 62) are coupled with a structure to be monitored by application of the sensor elements (20, 40, 52, 62) to a surface of the structure, or by imbedding the sensor elements (20, 40, 52, 62) within the structure, and the coupled sensor elements are periodically interrogated by the detector (28). Preferably, the microwire cores (22, 48) are placed in compression in order to suppress the inherent remagnetization responses thereof by means of a surrounding body (26) or surrounding layers (44, 46) formed of synthetic resin material which shrinks upon curing. When the sensor elements (20, 40, 52, 62) are strained as a result of a strain experienced by the monitored structure, the remagnetization responses of the microwire cores (22, 48) are substantially increased.

33 Claims, 3 Drawing Sheets

STRAIN SENSOR

CROSS-REFERENCE TO RELATED APPLICATIONS

This application claims the benefit of provisional application Ser. No. 61/269,448, filed Jun. 25, 2009 and provisional application Ser. No. 61/273,031, filed Jul. 30, 2009.

BACKGROUND OF THE INVENTION

1. Field of the Invention

The present invention is broadly concerned with strain sensor assemblies and methods, which are designed to be coupled with structures potentially subject to strains, in order to provide a wireless sensing of a strain threshold and/or progressive strain monitoring. More particularly, the invention is concerned with such assemblies and methods wherein a sensor element comprising a microwire having an amorphous or nanocrystalline metallic alloy core is applied to or imbedded in a structure such that the microwire core is placed in tension when the structure is subjected to strain. An induction detector separate from the structure is operable to interrogate the applied sensing microwire in order to induce a remagnetization response from the microwire core. The microwire core has a first remagnetization response of when the structure is unstrained, and a second, substantially greater, remagnetization response when the structure is strained.

2. Description of the Prior Art

Analysis and monitoring of stresses and strains plays a very important role in developing and maintaining engineered structures, such as bridges, buildings, or aircraft. Presently, the principal means of such monitoring is through the use of resistive strain gauges, in which a resister element made of fine conducting wire is secured to a support, which is in turn attached to a monitored structure. Structural deformations are transferred to the gauge wire, which proportionally changes the resistance thereof, and this change is monitored.

Increasingly, composite materials (e.g., carbon fiber-based composites) are used in constructing sophisticated structures, such as aircraft body components. It is very important to know the stress distributions inside of such composite parts, especially at areas such as glued connections, or the location of metal inserts. Conventional resistance-type strain gauges cannot be used in this context because the relatively large sizes thereof will create structural defects inside the composite parts. Another drawback of these resistive gauges is the necessity of having connecting wires or cables.

Attempts have been made in the past to devise miniature, essentially non-intrusive strain sensors with a wireless transfer of strain data. For example, WO2007/7054602 describes a multi-functional sensor device having a sensor made up of a multi-layer magnetic microwire consisting of a metal core surrounded by one or more outer layers, wherein at least the core or one of the outer layers is magnetic. The operation of the sensor relies on a magnetoelastic coupling between the magnetic layer of the sensor and the remainder of the layers. In order to detect strains in the surrounding structure, and consequently in the magnetic properties of the sensor, an AC current is passed through the metal core, picking up the output signal in the form of voltage, impedance, resistance, or inductance from the magnetic layer. This sensor still suffers from the problem of the necessity of wired connections to a monitoring device.

Sandacci et al., *Stress Dependent Magnetoimpedance of Co-Amorphous Wires with Induced Axial Anisotropy for Tunable Microwave Composites*, IEEE Transactions on Magnetics, Vol. 41, No. 10, October, 2005, pp. 3353-55, describe sensing microwires which may be incorporated into a dielectric matrix to provide wireless strain sensing via microwave interrogation. However, such microwave visualization is not usable with carbon fiber-based composites, because of the good electrical conductivity of the carbon filler.

Glass-coated amorphous sensing microwires have been used in the past in the context of electronic article surveillance (EAS) and authentication systems. Such sensing microwires, their production, magnetic properties, and behaviors, have been disclosed in the technical and patent literature. See, for example, U.S. Pat. Nos. 6,441,737 and 6,747,559; Horia Chirac, *Preparation and Characterization of Glass Covered Magnetic Wires*, Materials Science and Engineering A304-306, 166-71 (2001); Donald et al., *The Preparation, Properties and Applications of Some Glass Coated Metal Filaments Prepared by the Taylor-Wire Process*, Journal of Materials Science, 31, 1139-48 (1996); Wiesner and Schneider, *Magnetic Properties of Amorphous Fe—P Alloys Containing Ga, Ge, and As*, Phys. Stat. Sol. (a) 26, 71 (1974); and Antonenko et al, *High Frequency Properties of Glass-Coated Microwires*, Journal of Applied Physics, vol. 83, 6587-89. Continuous lengths of sensing microwires have been produced inexpensively by what is generally called in the art the Taylor process whereby either a pre-alloyed ingot or the required elemental constituents are melted in a generally vertically disposed glass tube that is sealed at the bottom. Once the alloy is converted to a molten state, using radio frequency ("rf") heating for example, the softened bottom of the glass tube is grasped and drawn continuously. Rapid reduction of alloy cross-section, together with use of secondary cooling means, cause the alloy to become amorphous or nanocrystalline during drawing.

A typical sensing microwire may have a total diameter (both the wire core and glass coating) of several tens of microns. The alloy core and glass coating can be physically coupled to each other continuously or only at several spatially separated points. The glass-to-metal ratio, though variable, can be tightly controlled. For example, the typical thickness of a glass coating may be from about 1-5 microns for a 45-60 micron core diameter microwire, and typically 1-3 microns for 30 micron core diameter microwire. Sensing microwire elements for prior art EAS and authentication tags are usually cut to lengths ranging from 15 mm to 75 mm.

Prior art glass-coated amorphous sensing microwires produced by the Taylor method can be fabricated so as to exhibit very low coercivities (substantially less than 10 A/m), high relative permeabilities (substantially higher than 20000), substantially zero or slightly positive magnetostrictions, and large Barkhausen discontinuities (which means that the microwires exist essentially only in bimodal magnetic states). The remagnetization properties of sensing microwires are also important and can be adjusted based upon the makeup of the core alloy and the other physical parameters of the sensing microwires.

See also, U.S. Pat. Nos. 6,556,139; 4,134,538; 6,622,913; and 7,354,645; Published Application 2005/0109435; and Zukov et al., J. Mater. Res. 15, No. 10, October 2000.

There is accordingly a need in the art for improved strain sensors and methods which are very small in size so as to be useful for internal monitoring of structures, while also permitting wireless interrogation of the sensors without the need for electrical wires or cables, and being useful with essentially all types of structures including carbon fiber composites.

SUMMARY OF THE INVENTION

The present invention overcomes the problems outlined above and provides strain sensor assemblies and methods designed for wireless strain monitoring of virtually all types of structures. A central operating principle of the strain sensors and sensor assemblies of the invention resides in the discovery that effective, wireless strain sensing for structures can be achieved through the use of a specialized sensing element including a sensing microwire made up of a metallic alloy core and (usually) a glass coating. The sensing element is coupled with a structure to be monitored so that, when the structure experiences strain, the metallic alloy core of the sensing microwire is placed in tension. The sensing microwire alloy core should have a positive magnetostriction property, a first remagnetization response (preferably a voltage amplitude of substantially zero) when the coupled structure is in an unstrained condition, and a second remagnetization voltage amplitude response substantially greater than the first response when the structure is in a strained condition and the sensing microwire is placed in tension. In particular, it is desirable that the voltage amplitude of the second remagnetization response be at least five times greater (more preferably, at least about 10 times greater) than the voltage amplitude of the first remagnetization response.

An overall sensing assembly includes one or more of the sensing elements, together with a detector for the cores of the sensing microwires, with the detector usually being separate and spaced from the monitored structure. Such a detector includes a transmitter unit operable to create an alternating magnetic field of sufficient magnitude to magnetically couple with the alloy cores of the sensing microwires in order to interrogate the sensing microwire cores and induce remagnetization responses. The detector further includes a remagnetization sensor operable to sense these remagnetization responses from the sensing microwire cores. Normally, the detector is coupled with a digital processor, which analyzes the response signals in order to determine either a threshold level of strain experienced by the structure, and/or a range of such strains.

A preferred technique for producing a sensing microwire of the invention is to place the alloy core thereof in compression so as to significantly reduce or entirely eliminate any Barkhausen remagnetization response of the core in an unstrained condition. However, when such sensing microwire cores are subjected to tensile forces sufficient to compensate for the built-in compression of the core so as to place the core in tension, the remagnetization response characteristic thereof is altered to give responses significantly greater than the initial unstrained response. Such a compressed core sensing microwire may be produced by co-extrusion of the alloy core and glass with a surrounding annular synthetic resin body, which contracts as it cools, or by lamination of a glass-coated alloy core within synthetic resin layers. In any case, the adjacent synthetic resin material becomes adhered to the inner microwire. Alternately, a glass-coated microwire may be imbedded in a body of paper pulp, which likewise contracts as it dries. Another alternative would be to paint the glass coating of a microwire with a solvent-based coating material which shrinks upon drying.

The remote detector generally comprises an AC waveform generator, an AC magnetic field generating coil or coils which periodically interrogates the sensing microwire(s) in order to induce characteristic remagnetization responses. The overall detector further includes a field receiving coil and a signal processing circuit. The output from the latter is directed to an interface, which may coupled with a display and/or and external computer or other digital processor.

In further embodiments, a sensing microwire of the invention may include one or more outer sheaths or layers of shape memory material serving to maintain the sensing microwire in its strained condition after the monitored structure experiences a sensed strain. Therefore, the remote detector may be used to detect the maximum strain theretofore experienced by the structure. In addition, a dual-wire sensing microwire may be provided wherein a second microwire serves as a reference, which is loosely mounted within a tube without placing the reference microwire under compression or other movement-inhibiting forces. The reference microwire core, when interrogated by the detector, provides a "reference value" which can be used to confirm a threshold strain within the monitored structure, notwithstanding the distance between the remote sensor and the sensing microwires. This "reference value" (hereafter named) can be the amplitude of the detected remagnetization voltage pulse, the duration of the pulse, or the area under the remagnetization voltage pulse vs. time curve.

DETAILED DESCRIPTION OF THE PREFERRED EMBODIMENT

Figure 1:
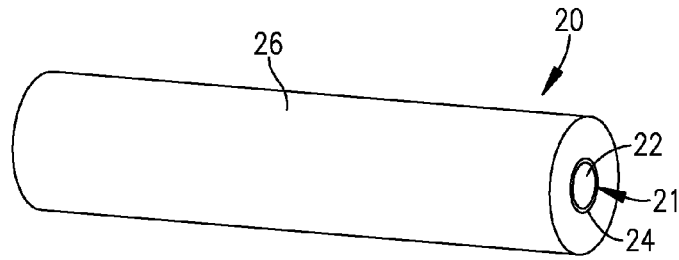
FIG. 1 is a perspective view of a microwire strain sensor element in accordance with the invention, including a central, amorphous or nanocrystalline microwire surrounded by glass and within an annular synthetic resin body serving to place the microwire in compression.
Figure 2:
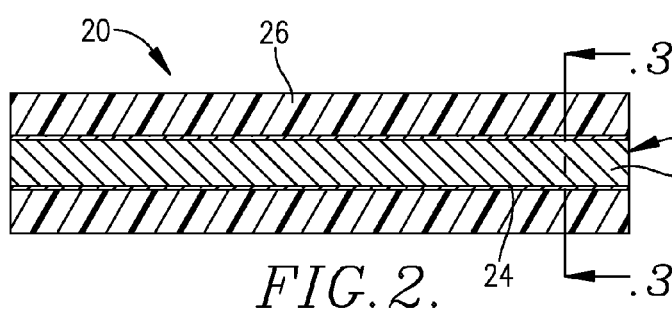
FIG. 2 is a vertical sectional view of the sensor element illustrated in FIG. 1.
Figure 3:
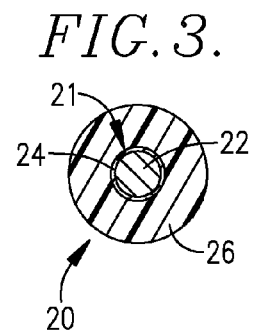
FIG. 3 is a vertical sectional view taken along line 3-3 of FIG. 2.

Turning now to the drawings, a sensing element 20 in accordance with the invention is illustrated in FIGS. 1-3. The sensing element 20 comprises a sensing microwire 21 with a central amorphous or nanocrystalline alloy core 22 having a positive magnetostriction property, surrounded by a thin coating of glass 24. An annular body 26 of synthetic resin material surrounds, engages and is adhered to the glass 24, and serves to place core 22 in sufficient compression so that the otherwise inherent Barkhausen remagnetization response of the core 22 is substantially reduced and is preferably substantially zero.

The core and glass have a diameter of a few tens of microns and a variable glass-to-metal ratio. For example, the typical thickness of glass coating 24 may be from about 1-5 microns for a 45-60 diameter micron core, and from about 1-3 microns for a 30 micron diameter core. The length of the sensing microwire 21 is also variable depending upon the intended usage, but would commonly range from about 15-75 mm. A variety of alloys may be used for the core 22, but an alloy containing 75.5% Co, 4.5% Fe, 12% Si, and 6% B by atomic percentages is suitable.

In preferred practice, the core-glass microwire is created using the Taylor process, followed by application of the synthetic resin body 26 by co-extrusion or injection molding. The material of the body 26 is characterized by shrinkage upon cooling and curing thereof so as to place core 22 under compression to thereby suppress the normal Barkhausen remagnetization response of the core, preferably to the point that the voltage amplitude of the response is substantially zero. A suitable synthetic resin material for this purpose is Polyester (PET), Polycarbonate, Polyamide-Imide (PAD, and other similar polymers, with the body 26 having an annular wall thickness of from about 0.1 to 5 mm. Of course, other suitable synthetic resin materials and thicknesses can also be employed, in order to meet the aims of the invention.

In use, a plurality of sensing elements 20 may be applied to the surface of a structure, or imbedded within the structure, for strain monitoring purposes. Any appropriate coupling expedient may be used, so long as the cores 22 of the sensing microwires 21 are placed in tension when the adjacent sections of the individual sensing microwires experience strains of a magnitude sought to be monitored.

Figure 11:
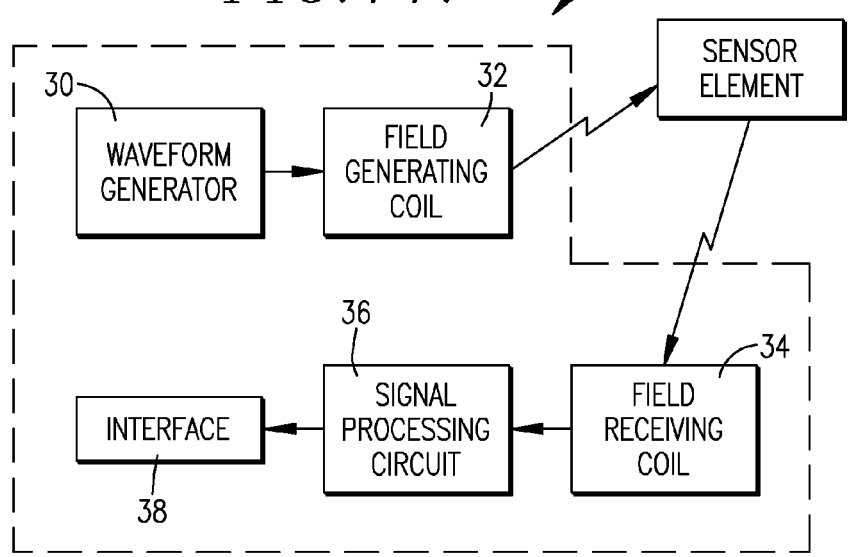
FIG. 11 is a schematic block diagram of an overall sensing assembly, including a sensing element and a magnetic induction detector.

Once the sensing elements 20 are coupled to the structure to be monitored, a remote detector 28 (FIG. 11) is used to periodically interrogate the sensing microwires 21. The detector 28 includes an AC waveform generator 30 coupled with a field generating coil or coil assembly 32. The field coil is employed to generate an alternating magnetic field, which magnetically couples with the cores 22 of the sensing microwires 21, in order to induce remagnetization responses from the cores. The detector 28 further includes a field receiving coil or coils 34, a signal processing circuit 36, and an interface 38. The coil 34 is designed to receive the remagnetization responses of the cores 22, while the circuit 36 at least partially analyzes the remagnetization responses, which are fed to interface 38. Depending upon the nature of circuit 36, a display may be coupled with interface 38 or, if necessary, a computer or other digital processing device may be connected with interface 38 in order to complete the signal processing and to create a readable display, or to initiate a strain alarm.

Preferably, the circuit 36 operates using a decoding algorithm having the capability to decode the magnetic field perturbation information received upon interrogation of the sensor element 20. The decoding algorithm may be in the form of one or more look-up tables stored within memory associated with the circuit 36, so that the remagnetization response data may be translated into usable strain information.

Normally, when the monitored structure is unstrained, the remagnetization responses received from the cores 22 are materially reduced, most preferably to a substantially or zero voltage amplitude, confirming the unstrained condition of the structure. However, in the event of stress-induced strains, the cores 22 are placed in tension owing to deformation of the sensing microwires 21 in the areas or regions of the strain. In such cases, the cores 22 have remagnetization responses greatly different from the responses when the structure is unstrained. Such differences in remagnetization responses can then be used as a measurement of incidence and/or the extent of strain experienced by the structure. Normally, the remagnetization responses of the cores 22 caused by structure strain are static. Therefore, low AC frequencies can be used in the detector 28, e.g., a few hundred hertz to a few kilohertz. These low frequency fields can penetrate carbon-filled composites and other structures without notable attenuation of the remagnetization response signals.

The sensing elements 20 and detector 28 make up a strain sensing assembly, which may be used as a threshold monitoring device or as a proportional sensor. In either case, when the tensile forces applied to the cores 22 of the sensing microwires 21 balance or overcome the compressive forces applied by the bodies 26 (the compensation point), the normal Barkhausen remagnetization signal inherent in the makeup of the cores 22 will reappear and be sensed by detector 28. However, inasmuch as the voltage pulse amplitude and/or the integral of the pulse voltage vs. time curve over the duration of the pulse (hereafter referred to as the "remagnetization signal value") of the remagnetization signals vary proportionately to the applied forces in the vicinity of the compensation point, the sensing microwires of the invention can be used as high-sensitivity strain sensors in preselected, definite strain ranges.

Figure 4:
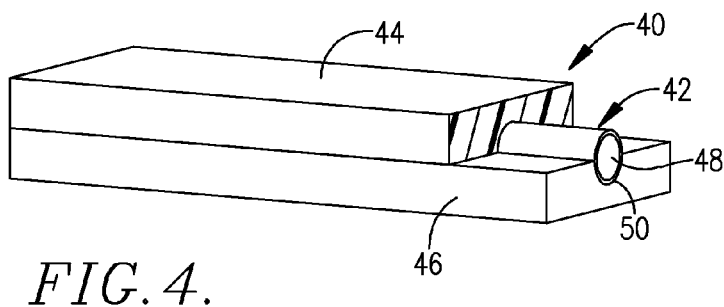
FIG. 4 is a perspective view in partial vertical section of a microwire strain sensor element of the invention mounted on a support in order to place the microwire in compression.
Figure 5:
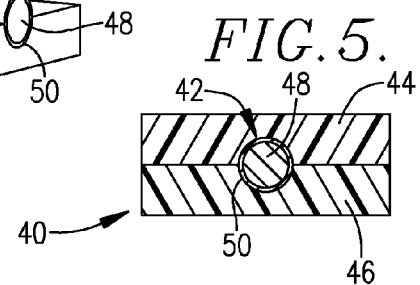
FIG. 5 is a vertical sectional view of the mounted microwire strain sensor element of FIG. 4.

FIGS. 4-5 illustrate another sensing element 40 including a glass-coated sensing microwire 42 laminated between two layers 44, 46 of synthetic resin material. The microwire 42 has a metallic alloy core 48 surrounded by glass 50, and is produced by the Taylor process. The core 48 and glass 50 are of a design similar or identical to the previously-described core 22 and glass 24. The material making up the layers 44, 46 is likewise designed to shrink during cooking and curing, in order to place the core 48 in compression sufficient to create a substantially reduced remagnetization response from the core 48. The use of sensing microwire 40 is the same as that described with reference sensing microwire 20, and thus needs not be repeated.

Figure 6:
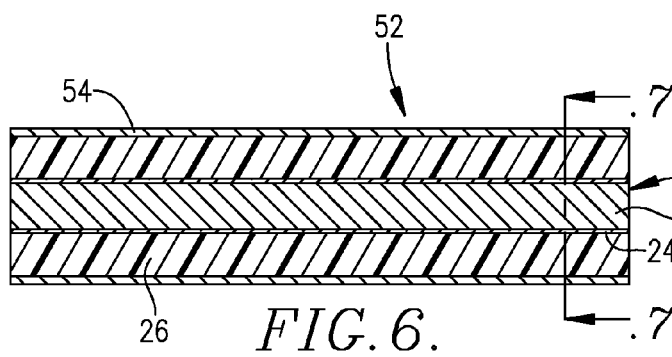
FIG. 6 is a vertical sectional view of another embodiment of the invention, wherein the microwire sensor element is equipped with an outermost sheath of a shape memory material.
Figure 7:
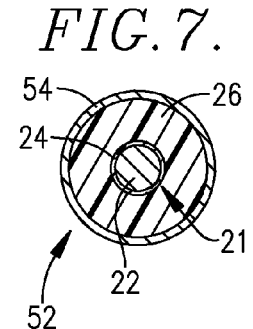
FIG. 7 is a vertical sectional view taken along line 7-7 of FIG. 6.

FIGS. 6-7 illustrate a third embodiment of the invention in the form of a sensor element 52, which is identical to the element 20 except for the provision of one or more external sheaths 54 of shape memory material. Accordingly, where the components of sensor element 52 are identical to those of sensor element 20, identical reference numerals are used. The sheath 54 may be formed from a shape memory alloy, such as Nitinol (NiTi alloys) available from SAES Memory Corporation or Johnson Matthey, Inc., or a shape memory polymer, such as linear block copolymers, crosslinked polyurethane, or PEO-PET (poly(oxyethtylene)-polyethylene terephthalate) crosslinked block copolymers. Shape memory materials of this type are extremely ductile below their As (Austenite start) temperatures, but will maintain their maximum deformation state until raised above the As temperatures.

The sheath 54 is initially in a state that does not interfere with the compressive force applied to the core 22 by body 26, but any strain experienced by a structure being monitored using sensor element 52 will be transferred to the shape memory sheath 54 (and thus to the body 26 and core 22). Further, the shape memory sheath 54 will cause the sensor element 52 to maintain its strained or deformed condition indefinitely, so long as the temperature of the sensor element stays below the As temperature of the sheath 54.

The sheath 54 (or combination of sheaths) need not be thick and may have a thickness of less than about 0.002 in. The sheath 54 is preferably adhered to the outer surface of body 26.

Figure 8:
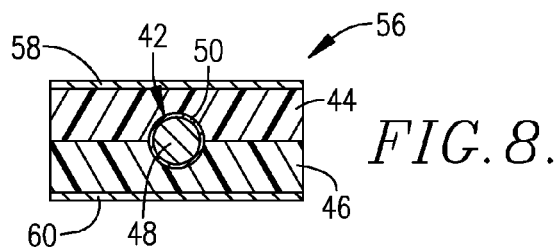
FIG. 8 is a vertical sectional view similar to that of FIG. 5, but showing the sensor element with a sheath of shape memory material.

A similar sensing element 56 is depicted in FIG. 8. In this instance, the sensor element 56 is identical with element 40 save for the provision of memory material layers 58 and 60 adhered to the opposite faces of the synthetic resin layers 44 and 46. Again, where the components of sensor element 56 are identical to those of element 40, the same reference numerals are employed. The shape material layers 58 and 60 of sensor element 56 function in the same fashion as the annular sheath 54 of sensor element 52, and may be fabricated using similar or identical materials.

The sensor elements 52 and 56, because of the shape memory material cladding thereof, serve to maintain the microwire core 22 or 48 in the strained condition thereof experienced by the coupled structure being monitored. Thus, any time after a strain has been experienced, the detector 28 may be used to detect the maximum strain yet experienced by the monitored structure. Furthermore, it is possible to "erase" the previous strain experienced by the sensor elements 52 or 56 by raising the temperature of the monitored structure and thus the shape memory material above the As temperature of the latter, allowing the shape memory material to relax into its initially unstrained condition. In this fashion, the body 26 or layers 44, 46 can again apply the compensating compressive forces to the cores 22, 48, so that the sensing elements are again operable to sense new strain conditions.

The remagnetization signal values of the detected Barkhausen remagnetization signals from the above-described sensor elements are dependent upon the distance and angle between the field receiving coil 34 and the structure-coupled sensor element. If the distance is great, the remagnetization signal value will be smaller than if the distance is less. Thus, if the strain sensor is used to determine a threshold strain, the exact remagnetization signal value of the remagnetization pulse correlated to the threshold strain is in part dependent upon the distance from the remote sensor element. Further, even if the threshold remagnetization signal value is some non-zero value, it must be given an output value via the circuit 36 that is at least greater than the inherent noise level of the system. Thus, the exact threshold remagnetization signal value to be used in the control algorithm cannot be the same for small receiving coil-to-sensor element distances as for larger distances. Accordingly, determining the threshold remagnetization signal value becomes difficult without knowledge of the actual distance between the field receiving coil 34 and the remote sensor element.

The issue of the dependence of remagnetization signal value upon the distance and angle from the field receiving coil 34 and a remote sensor element is also present in proportional strain sensor embodiments, because the remagnetization signal value must be correlated to strain over a range of values, where each remagnetization signal value is a function of distance between the sensor element and field receiving coil 34.

Figure 9:
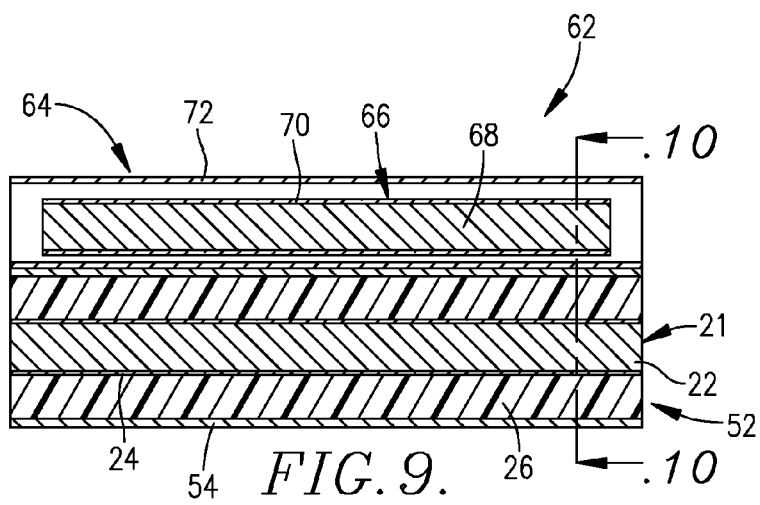
FIG. 9 is a vertical sectional view of a dual-microwire sensor element in accordance with the invention, wherein the second microwire serves as a reference microwire.
Figure 10:
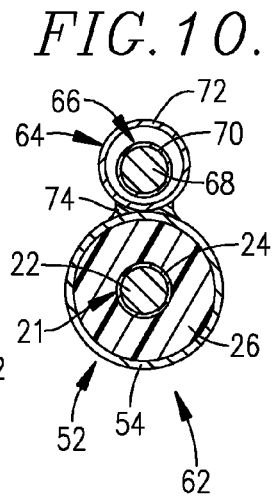
FIG. 10 is a vertical sectional view taken along line 10-10 of FIG. 9.

One technique for ameliorating these problems is depicted in FIGS. 9-10. As illustrated, the sensor element 62 includes the sensor element 52 of FIGS. 6-7, together with an auxiliary reference wire assembly 64. The reference numerals of FIGS. 6-7, where appropriate, are used in FIGS. 9-10. Referring to FIGS. 9-10, it will be observed that the reference wire assembly 64 has a glass coated microwire 66 having the usual amorphous or nanocrystalline metallic core 68 and glass coating 70, which is located adjacent the sensor element 52. The microwire 66 is positioned within a tubular sheath 72, and the latter is secured to sheath 54 by means of adhesive 74.

The core 68 of reference microwire 66 should be selected so that its coercivity is sufficiently different from that of the core 22 so that the resultant remagnetization reference value thereof can be readily detected and distinguished. The reference microwire 66 is loosely positioned within sheath 72, and does not otherwise have any structure for placing the core 68 thereof in compression. The sheath 72 is preferably formed of stainless steel, but can also be made from a superelastic alloy such as Nitinol, glass, or other rigid material capable of withstanding the environmental temperatures experienced by the monitored structure. Stainless steel tubes from Vita Needle Corporation, superelastic grade Nitinol tubing from SAES Memory Corporation, or glass capillary tubes from Polymicro are especially suitable. The length of the sheath 72 should be greater than that of the reference microwire 66, preferably at least about 10% greater in length, but to allow the reference microwire 66 to move freely within the sheath 72 without experiencing any compressive or tensile stresses.

The purpose of sheath 72 is to allow the reference microwire 66 to move freely within the tube despite any compressive, tensile, or other stresses experienced by the surrounding sheath. Thus, the reference value of the reference microwire 66, as measured by the remote detector 28 simultaneously with the remagnetization pulse of the adjacent microwire sensor 52, will be unaffected by the strain which may cause the microwire sensor 52 to change its remagnetization signal value when strained. In this fashion, the near-constant reference value of the reference microwire, despite changing stress conditions within the structure being monitored, can be used as a threshold value to determine when the remagnetization signal value of the microwire sensor 52 crosses said threshold value representative of the preselected threshold strain of the monitored structure, or to accurately correlate the measured remagnetization signal value of the microwire sensor 52 to the strain experienced by the supported structure, regardless of the distance between the sensor element 62 and the field receive coil 34.

Figure 12A:
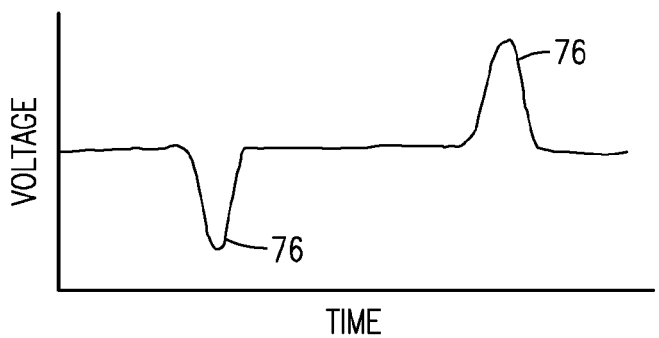
FIG. 12A is an exemplary hypothetical graph illustrating one full interrogation cycle of the dual-microwire embodiment of FIGS. 9-10, where the sensor element is placed at a distance X from the field receiving coil of a remagnetization response detector, and the monitored structure is unstrained.

FIG. 12A shows an example of the dual remagnetization pulse signal that would be detected over one full interrogation cycle for the sensor element 62 where the distance between the field receive coil 34 of detector 28 is at a distance X from the sensor element 62, and where the sensor element 62 is experiencing no strain. In this condition, the remagnetization signal value of the core 22 of sensor element 62 is undetectable, whereas the reference value of the core 68 of reference microwire 66 (peaks 76) is large.

Figure 12B:
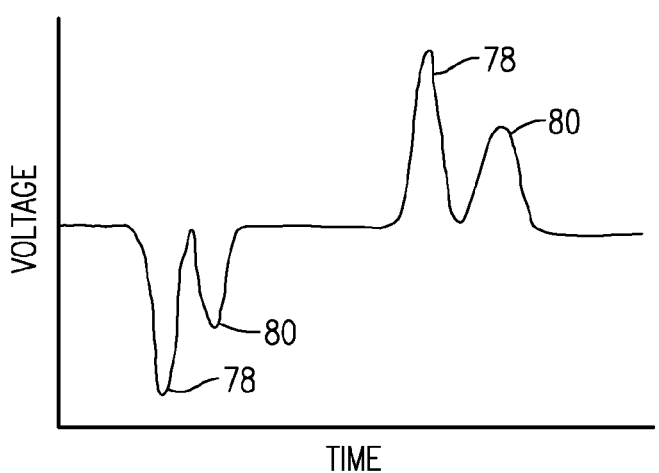
FIG. 12B is an exemplary hypothetical graph illustrating one full interrogation cycle of the dual-microwire embodiment of FIGS. 9-10, where the sensor element is placed at a distance X from the field receiving coil of a remagnetization response detector, and the monitored structure is strained above a preselected strain threshold.

FIG. 12B illustrates a situation identical to that of FIG. 12A, except that the monitored structure has experienced a strain above a preselected threshold value. In this case, the interrogation cycle gives a remagnetization signal value of the core 22 (peaks 78), which is greater than the reference value of the reference microwire core 68 (peaks 80).

Figure 13A:
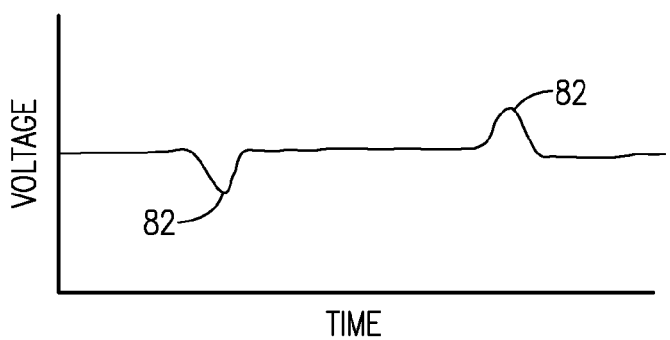
FIG. 13A is an exemplary hypothetical graph illustrating one full interrogation cycle of the dual-microwire embodiment of FIGS. 9-10, where the sensor element is placed at a distance 2X from the field receiving coil of a remagnetization response detector, and the monitored structure is unstrained.

FIG. 13A gives an example of the dual remagnetization pulse signals that would be detected over one full interrogation cycle using the dual-wire sensor element 62, where the distance from field receiving coil 34 to sensor element 62 is 2X, and the supported structure is unstrained. Again, the remagnetization response of core 22 is undetectable, while the reference value of the remagnetization response from core 68 of reference microwire 66 is calculated from peaks 82.

Figure 13B:
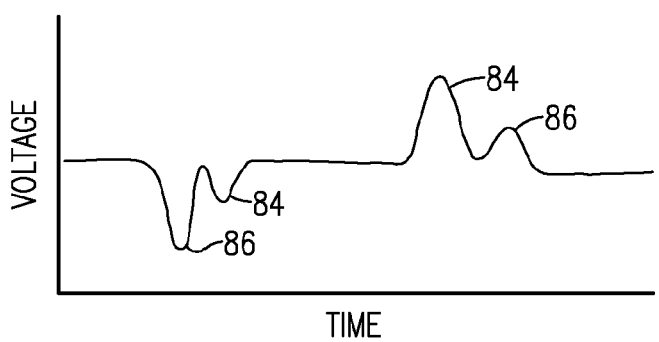
FIG. 13B is an exemplary hypothetical graph illustrating one full interrogation cycle of the dual-microwire embodiment of FIGS. 9-10, where the sensor element is placed at a distance X from the field receiving coil of a remagnetization response detector, and the monitored structure is strained above a preselected strain threshold.

FIG. 13B depicts an interrogation cycle as in FIG. 13A, but where the monitored structure has experienced a strain over a preselected threshold value. In this instance, the remagnetization signal value of the remagnetization pulse from the core 22 (peaks 84) is greater than that of the reference value of the pulse from core 68 of reference microwire 66 (peaks 86).

It will be appreciated that the comparative results illustrated in FIGS. 12A, 12B, 13A and 13B are based upon use of a reference microwire 66 designed so that its detected remagnetization reference value at any distance from the field receiving coil 34 is the selected threshold value for the remagnetization signal value of the core 22 of the sensor element 62 that correlates to the selected threshold strain value of the surrounding support material. Design considerations for such a reference microwire may include the chemistry and geometry of a glass-coated microwire, such as thickness, length, and configuration of the alloy core and glass coating. Thus, regardless of the actual reference value detected from the reference microwire, it is only necessary that the remagnetization signal value of the sensor element 62 is detected in excess of the reference wire's reference value, when the monitored structure experiences a stress exceeding the preselected threshold.

While the preferred microwire sensor elements of the invention have been described in the context of suppressing the inherent remagnetization responses thereof through the expedient of placing the alloy cores of the sensor elements under sufficient compression, it should be understood that the principles of the invention are broader. That is to say, any means of preparing a microwire sensor element which has an undetectable or very small remagnetization response in an unstrained condition, and a significantly greater remagnetization response when strained, meets the needs of the present invention.

We claim:

1. A strain sensor assembly operable to detect a strain in a structure, comprising:
    a sensor element comprising an elongated, amorphous or nanocrystalline sensing microwire operable to be coupled with said structure so that the sensing microwire is placed in tension when said structure is subjected to strain, said sensing microwire having a positive magnetostriction property, a first remagnetization response when said structure is in an unstrained condition, and a second remagnetization response substantially greater than said first remagnetization response when the structure is in a strained condition and said sensing microwire is placed in tension; and
    a detector separate from said structure and including a transmitter unit operable to create an alternating magnetic field of sufficient magnitude to magnetically couple with said sensing microwire in order to interrogate said sensing microwire and induce a sensing microwire remagnetization response, and a remagnetization sensor operable to sense said sensing microwire remagnetization response,
    whereby when said structure is in a strained condition, said remagnetization sensor will sense said second remagnetization response.

2. The assembly of claim 1, said sensing microwire comprising an amorphous or nanocrystalline microwire having said positive magnetostriction properties and being under axial compression sufficient to create said first remagnetization response.

3. The assembly of claim 2, said sensing microwire being glass-coated.

4. The assembly of claim 2, including a support for said sensing microwire which provides an axial compressive load to said sensing microwire.

5. The assembly of claim 4, said support selected from the group consisting of a synthetic resin body substantially surrounding said sensing microwire, a body of paper pulp substantially surrounding said sensing microwire, and a coating solvent-based coating material which shrinks upon drying.

6. The assembly of claim 1, said sensor element further including an outer sheath formed of shape memory material disposed substantially about said sensing microwire.

7. The assembly of claim 1, said sensor element including a reference microwire positioned proximal to said sensing microwire, said reference microwire having a coercivity substantially different than the coercivity of said sensing microwire and a remagnetization response which can be distinguished from the from the second remagnetization response of said sensing microwire regardless of the strained condition of said structure.

8. The assembly of claim 1, said sensor element being applied to or imbedded within said structure.

9. The assembly of claim 1, the voltage amplitude of said second remagnetization response being at least about five times greater than the voltage amplitude of said first remagnetization response.

10. The assembly of claim 1, the voltage amplitude of said first remagnetization response being substantially zero.

11. A method of detecting strain in a structure, comprising the steps of:
    coupling a sensor element comprising an elongated, amorphous or nanocrystalline sensing microwire to said structure so that the sensing microwire is placed in tension when said structure is subjected to strain,
    said sensing microwire having a positive magnetostriction property, a first remagnetization response when said structure is in an unstrained condition, and a second remagnetization response substantially greater than said first remagnetization response when the structure is in a strained condition and the sensing microwire is placed in tension;
    interrogating said sensor element by creating an alternating magnetic field of sufficient magnitude to magnetically couple with said sensing microwire in order to induce a sensing microwire remagnetization response; and
    sensing said sensing microwire remagnetization response as an indication of the strain condition of said structure.

12. The method of claim 11, said sensing microwire comprising an amorphous or nanocrystalline microwire having said positive magnetostriction properties and being under axial compression sufficient to create said first remagnetization response.

13. The method of claim 12, said sensing microwire being glass-coated.

14. The method of claim 12, said sensing microwire being on a support providing an axial compressive load to said sensing microwire.

15. The method of claim 14, said support selected from the group consisting of a synthetic resin body substantially surrounding said sensing microwire, a body of paper pulp substantially surrounding said sensing microwire, and a coating solvent-based coating material which shrinks upon drying.

16. The method of claim 11, said sensor element further including an outer sheath formed of shape memory material disposed substantially about said sensing microwire.

17. The method of claim 11, said sensor element including a reference microwire positioned proximal to said sensing microwire, said reference microwire having a coercivity substantially different than the coercivity of said sensing microwire and a remagnetization response which can be distinguished from the from the second remagnetization response of said sensing microwire regardless of the strained condition of said structure, said method further comprising the steps of causing said alternating magnetic field to interrogate said reference microwire in order to induce a reference microwire remagnetization response, detecting said reference microwire remagnetization response, and comparing the reference microwire remagnetization response to said sensing microwire remagnetization response.

18. The method of claim 11, said coupling step comprising the step of applying said sensor element to said structure, or imbedding said sensor element within said structure.

19. The method of claim 11, the voltage amplitude of said second remagnetization response being at least about five times greater than the voltage amplitude of said first remagnetization response.

20. The method of claim 11, the voltage amplitude of said first remagnetization response being substantially zero.

21. A strain sensor comprising:
   a sensor element comprising an elongated, amorphous or nanocrystalline sensing microwire having a positive magnetostriction property and an inherent Barkhausen remagnetization response magnitude;
   a shape memory material disposed about said sensor element; and
   a body of material operably engaging said sensing microwire and operable to place the sensing microwire under compression sufficient to substantially reduce said remagnetization response to a first, reduced magnitude.

22. The sensor of claim 21, said sensing microwire having a glass coating.

23. The sensor of claim 21, said sensing microwire, when placed in tension above a predetermined value, having a second remagnetization response magnitude substantially greater than said first remagnetization response magnitude.

24. The sensor of claim 23, said second remagnetization response magnitude being said inherent Barkhausen remagnetization response magnitude.

25. The sensor of claim 21, said material comprising a synthetic resin.

26. The sensor of claim 21, said first, reduced magnitude remagnetization response being substantially zero.

27. The sensor of claim 21, said first and second remagnetization response magnitudes being induced when said sensor element is interrogated by a remote, alternating magnetic field detector.

28. The sensor of claim 21, including an auxiliary reference wire assembly operably coupled with said sensor element.

29. The sensor of claim 28, said auxiliary reference wire assembly comprising a second amorphous or nanocrystalline reference microwire having a coercivity different than that of the sensor element.

30. The sensor of claim 29, including structure surrounding said reference microwire operable to allow the reference microwire to move freely despite compressive, tensile, or other stresses experienced by the surrounding structure.

31. A strain sensor comprising:
   a sensor element comprising an elongated, amorphous or nanocrystalline sensing microwire having a positive magnetostriction property and an inherent Barkhausen remagnetization response magnitude, and an auxiliary reference wire assembly operably coupled with said sensor element; and
   a body of material operably engaging said sensing microwire and operable to place the sensing microwire under compression sufficient to substantially reduce said remagnetization response to a first, reduced magnitude.

32. The sensor of claim 31, said auxiliary reference wire assembly comprising a second amorphous or nanocrystalline reference microwire having a coercivity different than that of the sensor element.

33. The sensor of claim 32, including structure surrounding said reference microwire operable to allow the reference microwire to move freely despite compressive, tensile, or other stresses experienced by the surrounding structure.

* * * * *